US006991311B2

(12) United States Patent
Su et al.

(10) Patent No.: US 6,991,311 B2
(45) Date of Patent: Jan. 31, 2006

(54) APPARATUS AND METHOD FOR INTRODUCING MICRO-VOLUME LIQUID

(75) Inventors: Shyh-Haur Su, Hsinchu (TW); Yung-Chin Lee, Miaoli (TW); Wu-Li Chen, Changhua (TW); Chung-Fan Chiou, Hsinchu (TW); Chien-Tsung Wu, Taichung (TW); Wen-Yeh Liao, Hsinchu (TW); Chiu-Neng Chen, Taoyuan (TW)

(73) Assignees: Industrial Technology Research Institute, Hsinchu (TW); Phalanx Biotech Group, Inc., Taipei (TW)

( * ) Notice: Subject to any disclaimer, the term of this patent is extended or adjusted under 35 U.S.C. 154(b) by 214 days.

(21) Appl. No.: 10/735,469

(22) Filed: Dec. 12, 2003

(65) Prior Publication Data

US 2005/0128260 A1 Jun. 16, 2005

(51) Int. Cl.
*B41J 2/165* (2006.01)

(52) U.S. Cl. ........................................................ 347/28

(58) Field of Classification Search .................. 347/20, 347/21, 22, 25, 27, 28

See application file for complete search history.

(56) References Cited

U.S. PATENT DOCUMENTS

| | | | | |
|---|---|---|---|---|
| 5,185,614 | A * | 2/1993 | Courian et al. | 347/24 |
| 5,529,756 | A * | 6/1996 | Brennan | 422/131 |
| 5,574,485 | A * | 11/1996 | Anderson et al. | 347/27 |
| 5,745,128 | A * | 4/1998 | Lam et al. | 346/140.1 |
| 5,786,829 | A * | 7/1998 | Pasciak et al. | 347/28 |
| 6,183,057 | B1 * | 2/2001 | Sharma et al. | 347/27 |

* cited by examiner

*Primary Examiner*—Anh T. N. Vo
(74) *Attorney, Agent, or Firm*—Quintero Law Office

(57) ABSTRACT

An apparatus and method for introducing micro-volume liquid. The method includes the following steps. A multi-channel inkjet print head is provided. The multi-channel inkjet print head includes a nozzle plate and a cartridge. The nozzle plate includes a plurality of nozzles. The cartridge includes a plurality of channels, communicating with the nozzles on the nozzle plate, and a plurality of openings located at the channels. The nozzle plate contacts with a buffer. The buffer is introduced into the channels via the nozzles on the nozzle plate by pressure. Reagents are introduced into the channels through the openings.

16 Claims, 7 Drawing Sheets

APPARATUS AND METHOD FOR INTRODUCING MICRO-VOLUME LIQUID

BACKGROUND OF THE INVENTION

1. Field of the Invention

The invention relates to an apparatus and method for introducing micro-volume liquid, and in particular, the invention relates to an introducing apparatus and method for a multi-channel inkjet print head.

2. Description of the Related Art

Methods for introducing micro-volume liquid into a print head are varied. For example, the liquid can be introduced into a reservoir thereof by pressuring, and then expelled out of orifices thereof. Such process, performed prior to actual deployment of the fluid, is referred to as priming. The purpose of priming is to saturate the print head and remove bubbles in channels thereof. In addition, other introducing methods are disclosed, for example, in U.S. Pat. Nos. 6,221,653, 6,458,583, 6,461,812, and 6,372,483.

For costly liquid, another introducing method is provided to reduce waste. In such introducing method, the nozzle plate of the print head first contacts the liquid. The liquid is then drawn into the reservoir from the nozzle plate by negative pressure. Thus, priming can be eliminated, and waste generated thereby can be reduced. Such method, however, can only introduce one kind of liquid at a time. Additionally, multiple reservoirs are required for different kinds of the liquid, and cross-contamination easily occurs between different reservoirs.

SUMMARY OF THE INVENTION

In view of this, the invention provides an apparatus and method for introducing liquid into a multi-channel inkjet print head.

Another purpose of the invention is to provide an apparatus and method for introducing a plurality of liquid at the same time.

Accordingly, the invention provides a method for introducing micro-volume liquid. The method includes the following steps. A multi-channel inkjet print head is provided. The multi-channel inkjet print head includes a cartridge and a nozzle plate with a plurality of nozzles. The cartridge includes a plurality of channels, communicating with the nozzles on the nozzle plate, and a plurality of openings located at the channels. The nozzle plate contacts a buffer. The buffer is introduced into the channels via the nozzles by providing a pressure. Reagents are introduced into the channels via the openings.

In a preferred embodiment, the buffer excludes biomolecules.

In another preferred embodiment, the method further includes the following step. After the buffer is introduced into the channels and filled the channels, part of the buffer is removed from the channels. It is noted that the volume of the removed buffer is not less than the volume of the introduced reagents.

In another preferred embodiment, the pressure is positive so that the buffer is pushed into the channels via the nozzle plate.

In another preferred embodiment, the pressure is negative so that the buffer is drawn into the channels via the openings. It is noted that the negative pressure is generated by vacuuming the openings.

In another preferred embodiment, the reagents include biomolecules therein, and biomolecules are oligonucleotides, peptides, proteins, or derivatives thereof. The reagents are introduced into the channels by pipettes.

In this invention, an apparatus for introducing micro-volume liquid is provided. The apparatus includes a multi-channel inkjet print head, a container, a pressure supply, and an injector. The multi-channel inkjet print head includes a cartridge and a nozzle plate with a plurality of nozzles. The cartridge includes a plurality of channels, communicating with the nozzles on the nozzle plate, and a plurality of openings located at the channels. The container receives a buffer. The buffer and the nozzle plate are in contact. The pressure supply communicates with the multi-channel inkjet print head, and provides pressure to the multi-channel inkjet print head so that the buffer is introduced into the channels. The injector communicates with the channels, and introduces reagents into the channels via the openings.

In a preferred embodiment, the apparatus further includes an absorber disposed in the channels to remove a predetermined amount of the buffer from the channels.

In another preferred embodiment, the pressure supply communicates with the container, and provides positive pressure to the container so that the buffer is pushed into the channels.

In another preferred embodiment, the pressure supply communicates with the openings, and provides a negative pressure to the channels so that the buffer is drawn into the channels.

It is noted that the injector may be a pipette.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
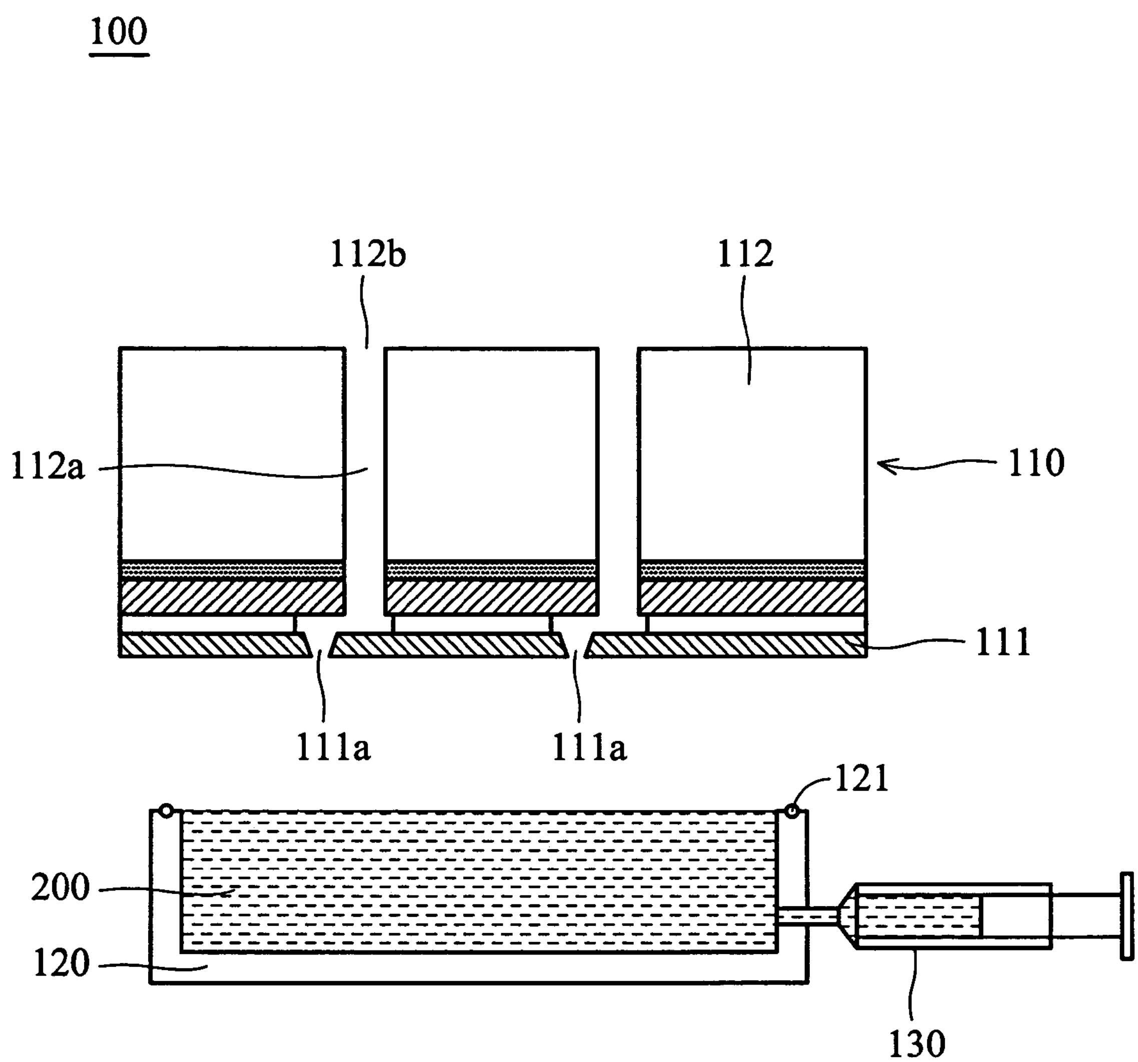
FIG. 1 is a schematic view of an introducing apparatus as disclosed in a first embodiment of the invention.

Referring to FIG. 1, an apparatus 100 for introducing micro-volume liquid as disclosed in a first embodiment of the invention is provided. The introducing apparatus 100 includes a multi-channel inkjet print head 110, a container 120, a pressure supply 130, two injectors 140, 140' (shown in FIG. 2*c*), and two absorbers 150 (shown in FIG. 3*a*).

The multi-channel inkjet print head 110 includes a nozzle plate 111 and a cartridge 112. The nozzle plate 111 includes a plurality of nozzles 111*a*. The cartridge 112 includes a plurality of channels 112*a*, communicating with the nozzles 111*a* on the nozzle plate 111, and a plurality of openings 112*b* located at the channels 112*a*. It is understood that the multi-channel inkjet print head 110 further includes a chip and a barrier layer. Since these are conventional devices and less related to this invention, they are not labeled and their description is omitted.

The container 120 receives a buffer 200 therein, and is sealed by an O-ring 121. The buffer 200 is a common ingredient for various reagents to be introduced into the channels 112*a*, and excludes biomolecules. Referring to FIG. 1, the pressure supply 130 communicates with the multi-channel inkjet print head 110 via the container 120. The pressure supply 130 provides positive pressure to the container 120 so that the buffer 200 is pushed and introduced into the channels 112*a* of the multi-channel inkjet print head 110 via the nozzles 111*a* on the nozzle plate 111.

Figure 2A:
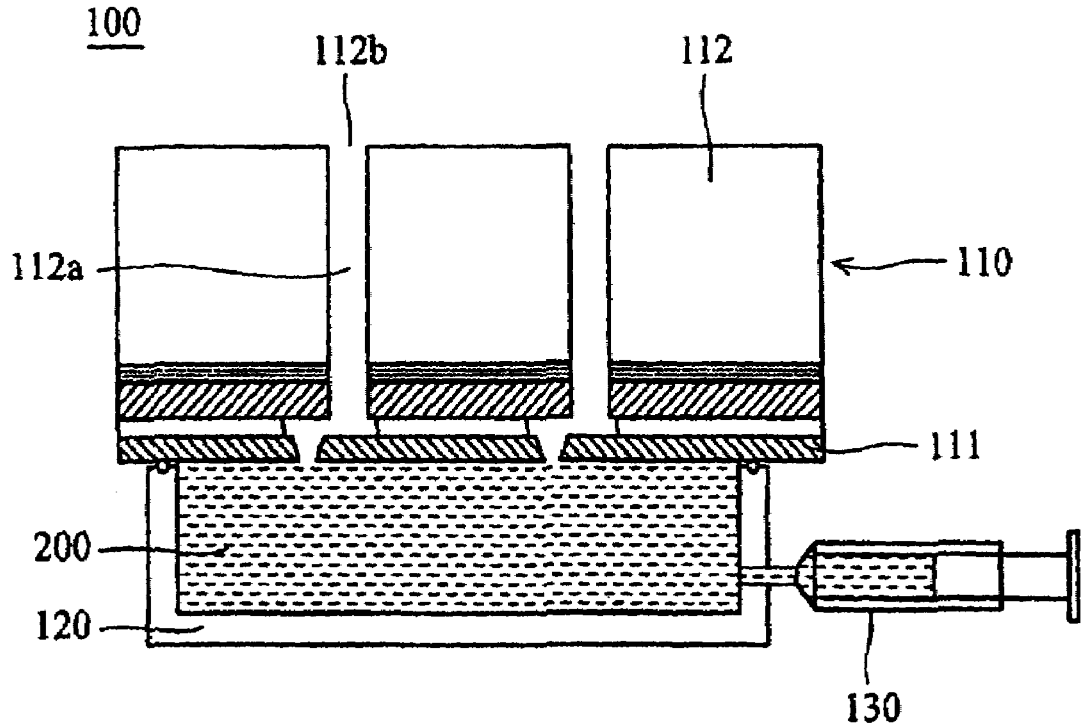
FIGS. 2*a*–2*d* are schematic views of an introducing method as disclosed in a first embodiment of the invention.
Figure 2B:
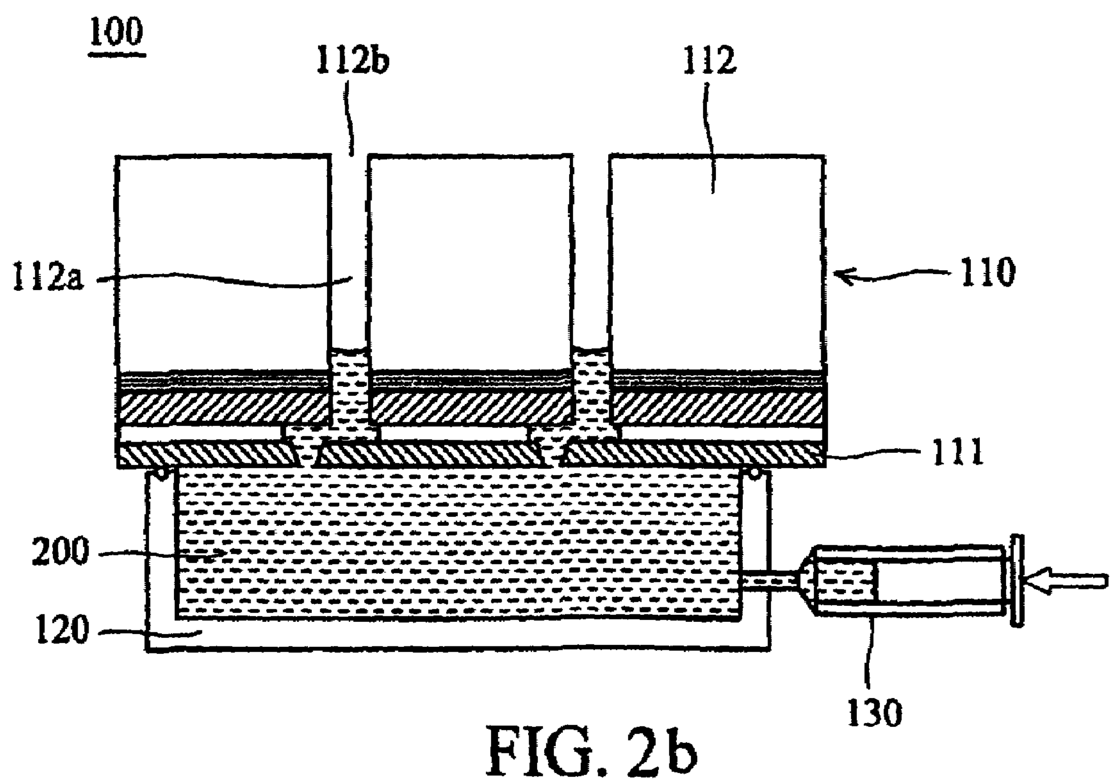
Figure 2C:
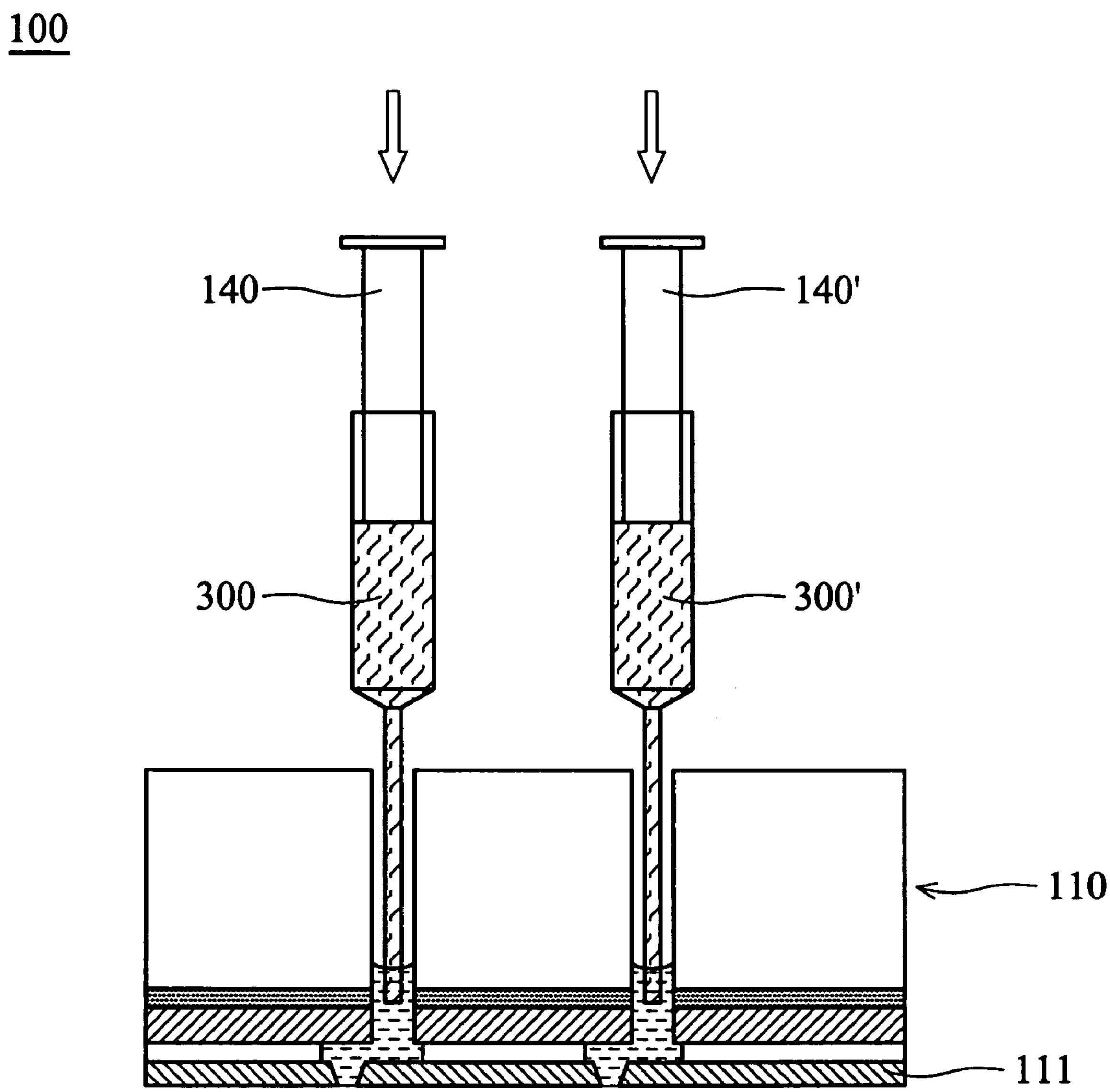
Figure 2D:
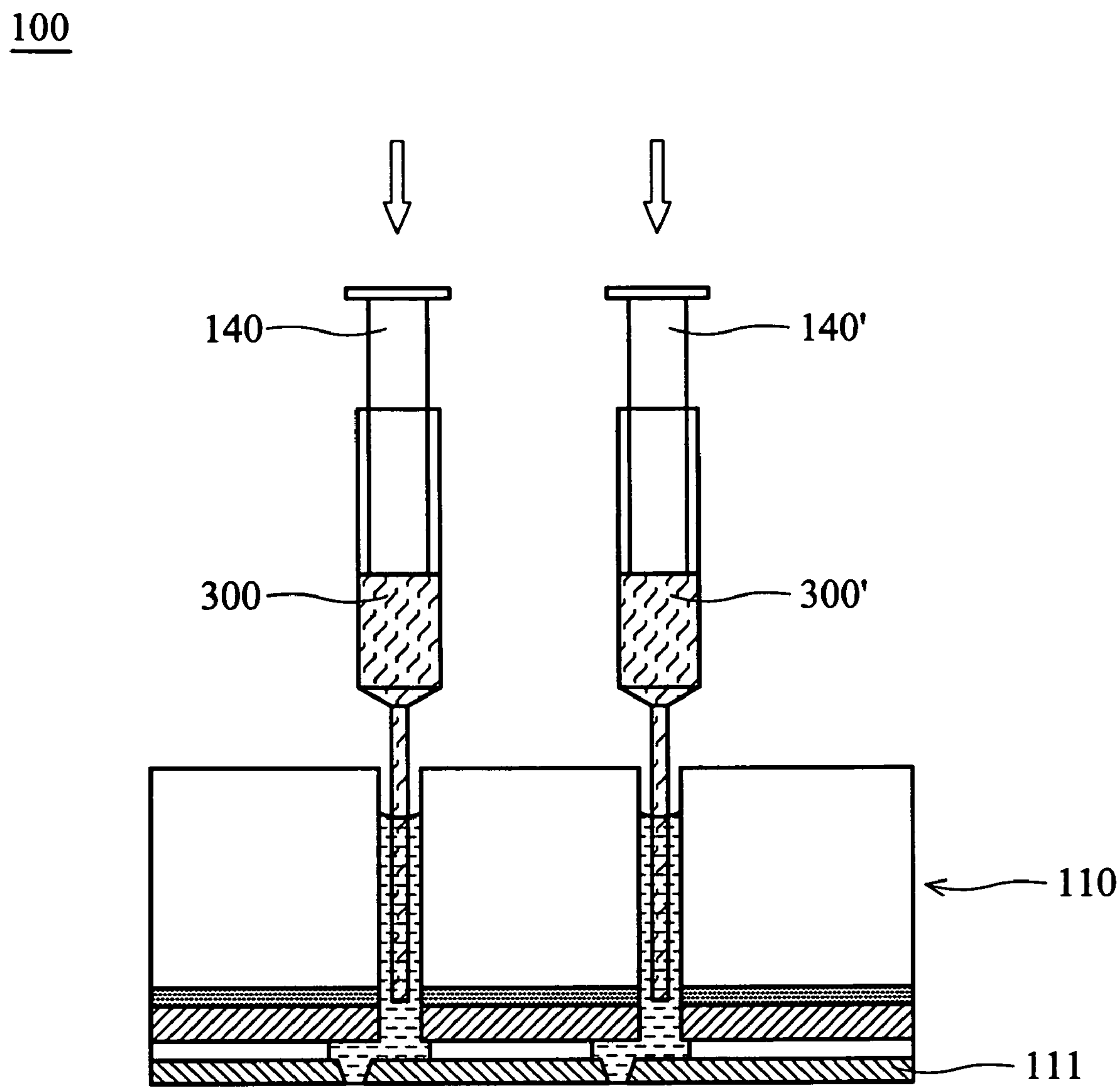

As shown in FIG. 2*c*, each injector 140 and 140' is disposed in the channel 112*a*, and introduces reagents 300 and 300' into the channels 112*a* via the openings 112*b* respectively. Each reagent 300 is provided in a higher concentration, and includes biomolecules therein. The biomolecules may be oligonucleotides, peptides, proteins, or derivatives thereof. The injector 140 may be a pipette. Although two injectors 140 and 140' are shown in FIG. 2*c*, the number of the injectors 140 is not limited to this. Based on the number of the channels 112*a*, the number of the injectors 140 is adjustable.

Figure 3A:
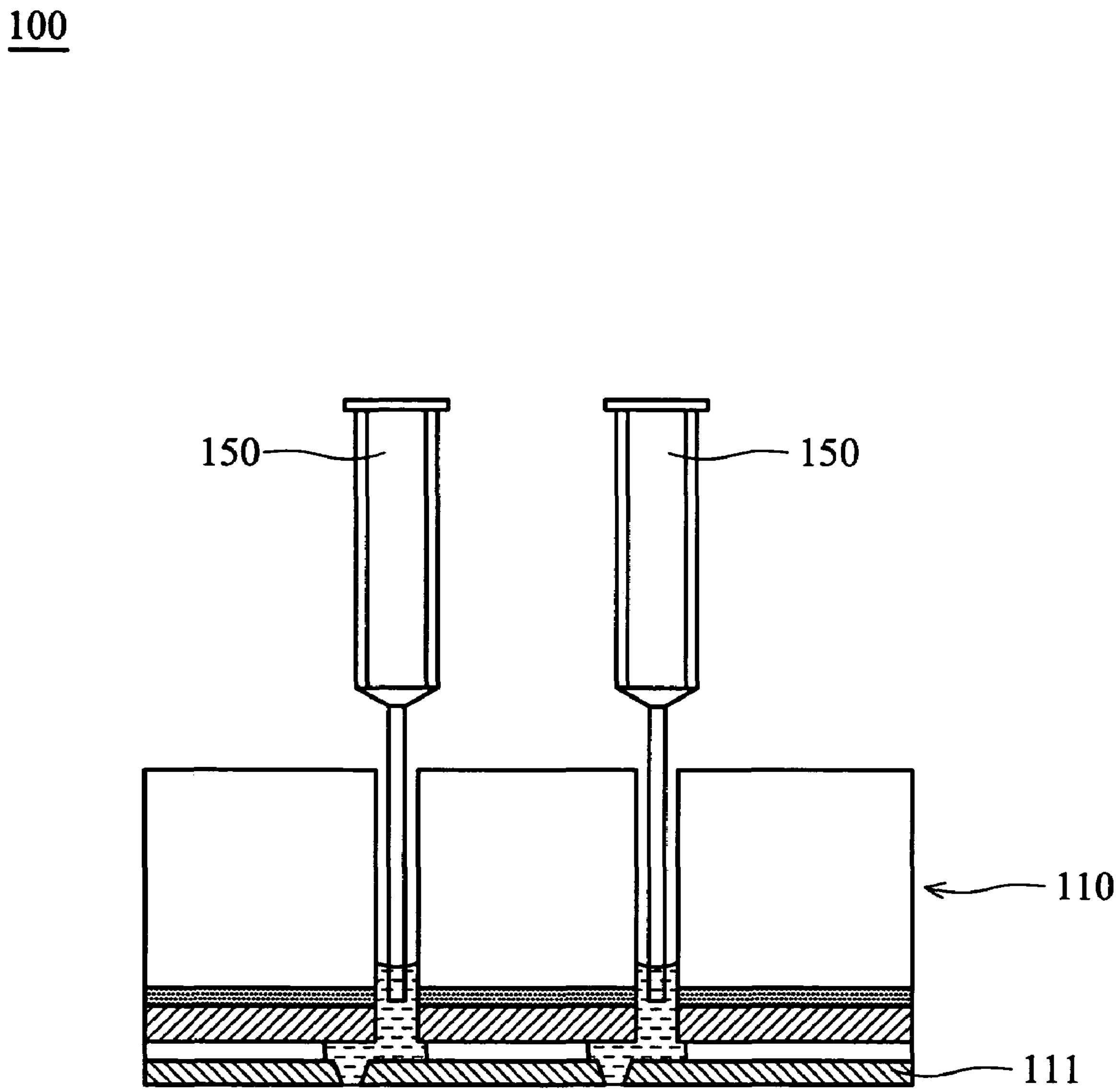
FIGS. 3*a*–3*b* are schematic views of additional processes of the introducing method in FIGS. 2*a*–2*d*.

As shown in FIG. 3*a*, each absorber 150 is disposed in a channel 112*a* to remove a predetermined amount of the buffer 200 therefrom. Although two absorbers 150 are shown in FIG. 3*a*, the number of the absorbers 150 is not limited to this. Based on the number of the channels 112*a*, the number of the absorbers 140 is adjustable.

The structure of the introducing apparatus 100 is described as above, and the introducing method using the introducing apparatus 100 is described in the following.

FIGS. 2*a*–2*d* show a method, for introducing micro-volume liquid, as disclosed in the invention. The introducing method includes the following steps. The multi-channel inkjet print head 110, the container 120, the pressure supply 130, and the injectors 140 are first provided. The nozzle plate 111 of the multi-channel inkjet print head 110 then contacts the buffer 200 in the container 120 via the O-ring 121 as shown in FIG. 2*a*. Sequentially, as shown in FIG. 2*b*, the pressure supply 130 provides positive pressure to the container 120 so that the buffer 200 is pushed and introduced into the channels 112*a* via the nozzles 111*a* on the nozzle plate 111. Finally, the injectors 140 are disposed in the channels 112*a* as shown in FIG. 2*c*, and the reagents 300 and 300' in the injectors 140 and 140' respectively are then introduced into the channels 112*a* through the openings 112*b*. Different kinds of the reagents 300 can be introduced into different channels 112*a* at the same time or in a predetermined order.

Figure 3B:
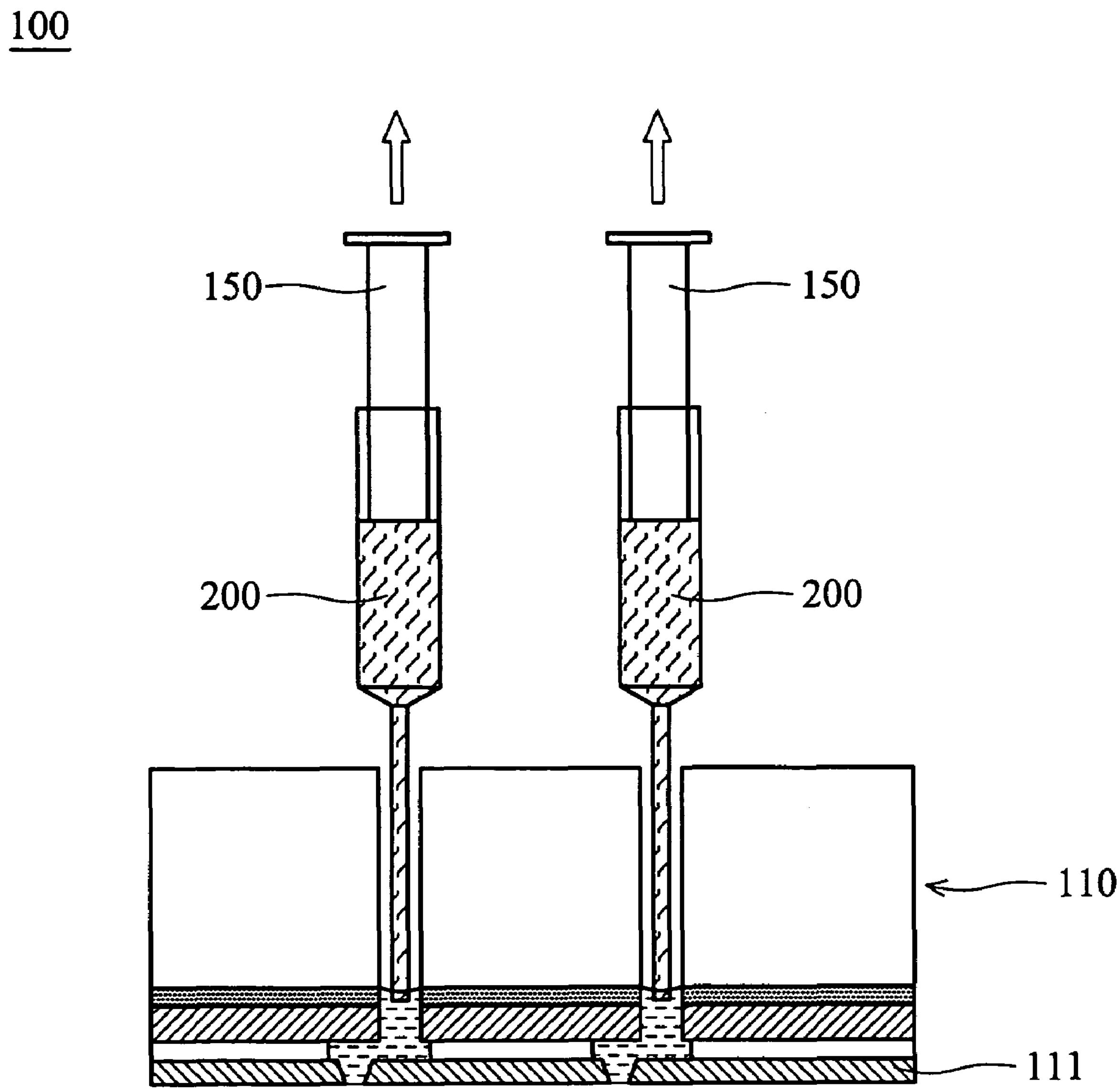

To adjust the amount of the buffer 200, the method may further include the following steps. Subsequent to introducing the buffer 200 into the channels 112*a*, the absorbers 150 are disposed in the channels 112*a* as shown in FIG. 3*a*. Part of the buffer 200 is then removed from the channels 112*a* as shown in FIG. 3*b*. The volume of the removed buffer 200 is not less than the volume of the reagents 300 to be introduced.

In the invention, the print head is saturated by the buffer, thus preventing waste of reagents. Additionally, since the channels are saturated at the same time, time required by priming can be reduced. Moreover, different kinds of the reagents can be introduced into the channels separately at the same time, thus avoiding cross-contamination.

Second Embodiment

Figure 4:
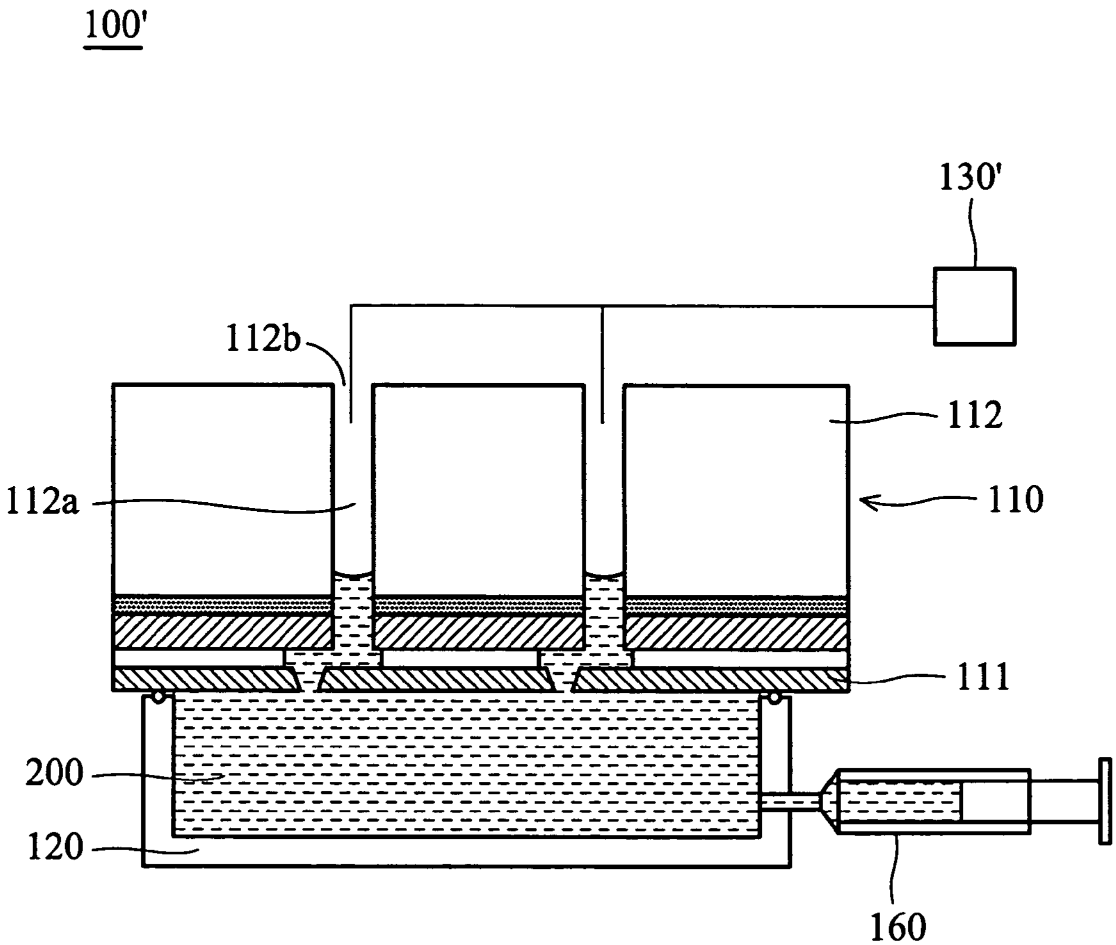
FIG. 4 is a schematic view of an introducing apparatus as disclosed in a second embodiment of the invention.

Referring to FIG. 4, an apparatus 100' for introducing micro-volume liquid as disclosed in a second embodiment of the invention is provided. The introducing apparatus 100' includes a multi-channel inkjet print head 110, a container 120, a pressure supply 130', two injectors (not shown), two absorbers (not shown), and a buffer supply 160. Devices of the second embodiment that are the same as those of the first embodiment are presented by the same references, and their description is omitted.

The second embodiment differs from the first embodiment in that the pressure supply 130' communicates with the openings 112*b* of the multi-channel inkjet print head 110, and provides negative pressure to the channels 112*a* so that the buffer 200 is drawn into the channels 112*a* from the buffer supply 160.

That is, to introduce the buffer 200 into the channels 112*a* in the introducing method of this embodiment, the pressure supply 130' provides negative pressure to the openings 112*b* so that the buffer 200 is drawn into the channels 112*a*. It is noted that the negative pressure may be generated by vacuuming the openings.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for introducing micro-volume liquid comprising:

providing a multi-channel inkjet print head including a cartridge and a nozzle plate with a plurality of nozzles, wherein the cartridge includes a plurality of channels, communicating with the nozzles on the nozzle plate, and a plurality of openings located at the channels;

contacting the nozzle plate with a buffer;

introducing the buffer into the channels via the nozzles by providing a pressure; and introducing reagents into the channels via the openings.

2. The method as claimed in claim 1, wherein the buffer excludes biomolecules therein.

3. The method as claimed in claim 1, further comprising:

after introducing the buffer into the channels, removing part of the buffer from the channels.

4. The method as claimed in claim 3, wherein the volume of the removed buffer is not less than the volume of the introduced reagents.

5. The method as claimed in claim 1, wherein the pressure is positive so that the buffer is pushed into the channels via the nozzles.

6. The method as claimed in claim 1, wherein the pressure is negative so that the buffer is drawn into the channels via the openings.

7. The method as claimed in claim 6, wherein the negative pressure is generated by vacuuming the openings.

8. The method as claimed in claim 1, wherein the reagents include biomolecules therein, and the biomolecules are oligonucleotides, peptides, proteins, or derivatives thereof.

9. The method as claimed in claim 1, wherein the reagents are introduced into the channels by pipettes.

10. An apparatus for introducing micro-volume liquid comprising:

a multi-channel inkjet print head including cartridge and a nozzle plate with a plurality of nozzles, wherein the cartridge includes a plurality of channels, communicating with the nozzles on the nozzle plate, and a plurality of openings located at the channels;

a container for receiving a buffer, wherein the buffer and the nozzle plate are in contact;

a pressure supply for providing pressure to the multi-channel inkjet print head so that the buffer is introduced into the channels; and an injector, disposed in the channels, for receiving a reagent therein and introducing the reagent into the channels via the openings.

11. The apparatus as claimed in claim 10, further comprising:

an absorber, disposed in the channels, for removing a predetermined amount of the buffer from the channels.

12. The apparatus as claimed in claim 10, wherein the pressure supply communicates with the container, and provides a positive pressure to the container so that the buffer is pushed into the channels.

13. The apparatus as claimed in claim 10, wherein the pressure supply communicates with the openings, and provides a negative pressure to the channels so that the buffer is drawn into the channels.

14. The apparatus as claimed in claim 10, wherein the reagents includes biomolecules therein, and the biomolecules are oligonucleotides, peptides, proteins, or derivatives thereof.

15. The apparatus as claimed in claim 10, wherein the buffer excludes the biomolecules.

16. The apparatus as claimed in claim 10, wherein the injector is a pipette.

* * * * *